Patented Oct. 6, 1931

1,826,699

UNITED STATES PATENT OFFICE

WILLIAM HALE CHARCH, OF BUFFALO, NEW YORK, AND KARL EDWIN PRINDLE, OF CLEVELAND, OHIO, ASSIGNORS TO DU PONT CELLOPHANE COMPANY, INC., OF NEW YORK, N. Y., A CORPORATION OF DELAWARE

METHOD OF PREPARING MOISTUREPROOF MATERIALS

No Drawing. Original application filed January 3, 1927, Serial No. 158,816. Divided and application filed September 27, 1928, Serial No. 308,873. This division divided and application filed May 2, 1931. Serial No. 534,688.

This invention relates to a method of moistureproofing and more particularly to a method of moistureproofing transparent materials, such as, for example, transparent sheets or films of regenerated cellulose without impairing the transparency of the base.

Many foodstuffs and other articles are wrapped in waxed paper to maintain them in the original condition or state. Waxed papers are waterproof and moistureproof in the ordinary sense of the word and also in varying degrees. They are, however, opaque or translucent, of appreciable thickness, brittle and crack upon crumbling. Even the best of them cannot be used where flexibility and transparency as well as moistureproofness are required.

We have found that, if a base formed, for example, of a cellulosic material, and particularly a transparent material of which sheets or films of regenerated cellulose are illustrative, is combined as by being coated with a composition containing a minor quantity of a waxy material and the coated material then subjected to a temperature above the melting point of the waxy material in the composition, we can produce a product which is not only waterproof but also moistureproof, flexible, non-tacky, odorless and preferably also transparent.

It is therefore an object of this invention to provide a method of moistureproofing various bases including cellulosic materials and/or transparent bases without destroying or even impairing any of the desirable properties of the base.

Other objects will appear from the following description and appended claims.

In accordance with the principles of this invention a composition, preferably one containing a minor quantity of a waxy material, is applied to the base formed of a cellulosic material, for example, transparent sheets or films of regenerated cellulose, and the coated material dried at an elevated temperature. Preferably, the drying is carried out with warm air not exceeding 90° C. or 100° C. For optimum results the temperature of the air should be above the melting point of the waxy substances in the composition. After drying, the product is subjected to the action of heat, in order to more thoroughly remove the last traces of a solvent and make the product entirely odorless, and/or a humidifying atmosphere, for example, steam, for a short time to increase or restore the flexibility of the coated material.

In order to more clearly explain the invention, it will be described in connection with specific moistureproofing compositions as hereinafter set forth. It is to be understood that the invention is not restricted to the specific compositions herein described, since it is apparent that the proportions of the ingredients may vary within wide limits, depending partly on the characteristics desired in the product.

In one of its modifications, the moistureproofing composition contains a minor quantity of a waxy material together with a base, a gum or resin with or without a plasticizer dissolved in a suitable solvent. By the term "solvent" employed in this specification is meant one or more solvents for cellulose derivatives either alone or admixed with one or more diluents to constitute what are commonly called solvent mixtures. It is to be understood that the solvent is of such a nature that the solid ingredients are all soluble and mutually compatible therein to form a homogeneous mixture. The materials constituting the composition may be mixed in different proportions, depending upon the qualities required in the finished product.

For the base we prefer to use a cellulosic derivative, such as a cellulose ester, and more particularly a nitrocellulose of the pyroxylin type, because of its economy, although cellulose acetate or an ether for example ethyl cellulose or other cellulose ethers may be employed with satisfactory results. The base is preferably one yielding a solution of low viscosity, because this quality permits working with more highly concentrated solutions than could be used with a base yielding a solution of high viscosity.

For the gum we have found that gum dammar is very satisfactory, either singly or in combination with certain other gums. Some of the other gums that are preferably used either singly or in combination are ester gum, rosin, gum mastic or the copal resins. It is to be understood that the gums may be either natural or synthetic, as it is possible to manufacture certain synthetic gums that are quite satisfactory substitutes for the natural ones. The term "resin" employed herein and in the claims is intended to cover gums and resins, both natural or synthetic, as above mentioned.

For the wax we prefer to use a high melting paraffin wax as giving greater resistance to moisture than the low melting paraffin. The paraffin being colorless and odorless is preferable to other waxes from these standpoints and also from the standpoint of economy. Examples of other waxes which may be used are ceresin, either hard or soft, and beeswax. The above waxes may be used either singly or mixed with each other or with other waxes as may be found desirable.

For the plasticizer we preferably employ one of the compounds or mixtures of compounds having a high boiling point and which are known as "plasticizers" or "softeners" for cellulose esters or ethers, such as nitrocellulose, cellulose acetate, ethyl cellulose, etc. We prefer to use a plasticizer which shall be substantially odorless and have obtained satisfactory results from using tri-cresyl phosphate, tri-phenyl phosphate, di-amyl phthalate or di-butyl phthalate, or castor oil.

The above ingredients, when used in the proper proportions and with a suitable solvent, give a material which, after evaporation of the solvent at an elevated temperature, is not only moistureproof but which also is flexible without cracking, which is perfectly transparent, which is free from greasiness or tackiness, and which has the requisite tensile strength for the purposes to which it is desired that it be put.

The approximate limits may be given broadly as follows, the percentages being by weight:

| | Per cent |
|---|---|
| Base | 30 to 70 |
| Resin | 30 to 60 |
| Wax | 2 to 6 |
| Plasticizer | 5 to 30 |

The exact proportions of the various ingredients will vary according to the qualities desired in the finished product, and these qualities will depend upon the use to which the product is to be put. For example, if freedom from greasiness or tackiness is not essential, then the proportions and kinds of resin and wax may be varied to obtain a mixture which will be easier to make and yet will have all the desired qualities except freedom from greasiness or tackiness. By varying the proportions of the ingredients it is possible to obtain a composition with wide variations in the various qualities. By varying the quantity of wax we can obtain a wide range in the degree of resistance to moisture; by varying the quantity of or even omitting entirely the plasticizer, all degrees of flexibility may be obtained; and by regulating the nature and quantity of the resin, wax and plasticizer, a wide range in the degree of transparency may be obtained. The plasticizer may also be omitted when the so-called plasticizing or soft resins are employed as the resin component of the composition.

It is to be understood that the invention is not restricted to the precise compositions hereinafter described, since it is apparent that the proportions of the ingredients may vary within wide limits depending partly on the characteristics desired in the product.

Hereafter there are set forth certain specific ratios of the proportions of ingredients which have been found satisfactory for producing moistureproof sheets or films of regenerated cellulose which are also characterized by being substantially perfectly transparent, flexible and non-tacky as well as having a high gloss or brilliance.

The amount of base, which is preferably a nitrocellulose of the pyroxylin type, is usually chosen with respect to the particular resin which is employed. The ratio by weight of resin to base may vary between the limits 2:1 and 1:2. When the ratio exceeds 2:1 cracking of the material may result, if resins of the hard type are used. We have found that ratios within the limits of 1:1 and 1:1¾ are satisfactory for the hard type of resins.

The quantity of resin used depends upon the resin which is chosen, particularly with respect to its complete solubility and its ability to blend with the wax, and also the amount of base used with it. The preferred ratio of resin to base has been given above. A high ratio of hard resin to base renders the material brittle when used as a coating. A too low percentage of resin may result in a poor blending with the wax and thus a decrease of transparency and an increase in greasiness or tackiness.

The wax preferably should be kept below 10% by weight of the total solids, and the best results are obtained when this percentage is kept between 2% and 6%. When the percentage approaches or exceeds 10%, crystallization of the waxes may begin, thus decreasing transparency. However, the moistureproof quality is not materially affected, providing the same ratio of plasticizer to wax is retained and therefore a relatively large percentage of wax may be used when a relatively low degree of transparency is permissible.

The amount of plasticizer depends chiefly on the cellulose derivative and the degree of flexibility desired in the product. It may depend in part on the amount of wax and also upon the ratio by weight of the amount of resin to the amount of base. When this ratio is relatively large, a greater quantity of plasticizer should be used to overcome the brittleness, which is developed by the relatively large amount of resin. Moreover, the degree of moistureproofness may depend partly upon the ratio of the wax to the plasticizer and, therefore, this ratio partly determines the percentage of plasticizer employed. The ratio of plasticizer to wax may vary between the limits of 1:1 and 4:1 with good results in the way of achieving a moistureproof material.

We have discussed above the proper ratios of the hard variety of resin to the base and of plasticizer to wax. It now remains to discuss the preferred ratio of the combined weights of base and resin to the combined weights of wax and plasticizer. The combined weights of base and resin are usually several times greater than the combined weights of wax and plasticizer. The ratio of the weights of base and resin combined to the weights of wax and plasticizer combined may vary between the limits of about 2.3:1 and 10:1, but we find that the preferred ratio is between 4:1 and 8:1. If the ratio is less than 2.3:1 the sheet or coating will either become tacky, due to the high percentage of plasticizer, or will become opaque and greasy due to the high percentage of wax. When the ratio of weights of resin and base to plasticizer and wax is greater than 10:1, the sheet or coating will usually have a tendency to crack due to the small amount of plasticizer and the relatively large amount of resin, or will possess an undesirably low degree of moisture resistance due to the low amount of wax employed.

It is seen from the above that in determining the ingredients the nature and quantity of any one must be chosen with respect to that of all the other ingredients, if we are to obtain a product which will exhibit at once all of the desirable properties already enumerated. In this matter the choice is defined by the above approximate limits, but the following examples illustrate several excellent combinations which have been employed with success. We have classed as solids the ingredients of the composition which are dissolved in a solvent for the purpose of manufacturing the finished article. While the plasticizer may appear as a liquid, nevertheless, it is non-volatile and remains in the coating after it is dry and therefore, for the purpose of this application and for convenience, all of the ingredients are referred to as solids.

| Solid constituent | Per cent based on total weight of solids |
|---|---|
| Example 1: | |
| Nitrocellulose | 52 |
| Ester gum | 35 |
| Di-butyl phthalate | 8.7 |
| Paraffin | 4.3 |
| Example 2: | |
| Nitrocellulose | 50 |
| Gum dammar | 34 |
| Tri-cresyl phosphate | 12 |
| Paraffin | 4 |

The above formulas are given merely as exemplary and it is to be understood that we do not consider ourselves limited thereby. Other formulas may be developed by those skilled in the art when taught by the above disclosure.

The composition is formed by mixing together the ingredients in the desired percentage which may be fixed upon for the particular purposes for which the product is to be used. The mixture is then dissolved, using preferably any well known organic solvent which is readily volatile and will consequently evaporate rapidly. The particular solvent used is determined chiefly with reference to the method of application and to the nature and percentages of the solid ingredients. The solvent must be such as to retain all of the solid ingredients in a homogeneous solution. The wax and base ordinarily do not mix to form a clear film but by a proper choice of quantity and kind of resin, it has been found possible to make the combined resin and wax mix with the base and plasticizer. The solvent must then be chosen to retain the resin, wax, base and plasticizer in their proper proportions in complete solution, so that upon evaporation of the solvent a moistureproof, transparent, flexible and non-tacky film is produced.

It is usual to employ solvent materials for the wax up to 50% or over by weight, in order to maintain the wax in solution during the process of drying of the coating or sheet. Generally speaking, also, it is economical to employ relatively low percentages of intermediate boiling solvents for nitrocellulose. By employing these solvents in a proportion of 10% and under of the total solvent, we prevent too rapid drying of the coating which would cause cooling of the surrounding atmosphere and precipitation of water vapor on the material.

While the particular solvent must be determined separately for the particular composition, we give below the specific solvent combinations which we have found may be used with the respective examples of compositions given above.

Solvent for Example 1: Per cent based on total volume of solvent
- Alcohol ---------------------------- 25
- Ether ------------------------------ 43
- Toluene ---------------------------- 18
- Butyl acetate ---------------------- 14

Solvent for Example 2:
- Ethyl acetate ---------------------- 62
- Toluene ---------------------------- 27
- Alcohol ---------------------------- 9
- Butyl acetate ---------------------- 2

The solution may be used in a variety of ways. It may be cast by known methods into thin sheets which, after being heated in accordance with this invention, are transparent, flexible, have the required tensile strength and at the same time are several times more moistureproof than anything hitherto known that have the other qualities mentioned above. The films will have the ability to resist the transmission or diffusion of water vapor to an extent at least 3 times as great as that displayed by films of equal thickness and produced from cellulose ester lacquers heretofore formulated without admixture of waxes or wax-like materials when tested under the same conditions. It is to be understood that the value 3 merely sets forth the minimum improvement and in nowise limits the higher degrees of moistureproofing that can be obtained. The compositions, herein described, are inherently capable in many formulations prepared according to the disclosure herein set forth, of producing films showing an improvement over the prior art films of not only 3 but 10, 20, 40 and in some cases 100 fold. This is an effect which has been heretofore impossible to secure with cellulose ester lacquers formulated in the usual way with gums, resins, oils, plasticizers, etc., but without waxes or wax-like materials.

Again the solution may be applied in the form of a coating of sheets or films of cellulose regenerated from viscose, the coating being done by suitable machines. In accordance with this process which constitutes the present invention, after the sheet or film of regenerated cellulose has been coated with the composition, it is dried preferably with warm air of a temperature not exceeding 90° C. or 100° C. It is preferable to keep the temperature of the air above the melting or crystallization point of the wax or waxes in the composition, hereinafter referred to as the melting point of the wax or waxes in the composition, thereby preventing separation or crystallization of the wax during the drying operation. It is also preferable to use air low in moisture content to aid in the evaporation of the solvent. Subsequent to the drying, the product is preferably subjected to the action of heat for a short time in order to more thoroughly remove the last traces of the solvent and thus make the product entirely odorless. Preferably, the coated film, after drying, is subjected to the action of a hot humidifying atmosphere to restore or increase the flexibility of the product and to aid in the elimination of residual solvents.

Sheets or films of regenerated cellulose may be coated on one or both sides, the coating being from .00005" to .0005" thick or thicker. In practice it has been found that it is sufficient to apply a coating .0001" to each side of the sheet or film of regenerated cellulose. When such materials are submitted to standard tests, the results clearly indicate that said product or film of regenerated cellulose will yield a product which is at least 7 times as effective in resisting the transmission of moisture or water vapor therethrough as the uncoated sheets or films when tested under the same conditions. The value 7 merely indicates the minimum improvement and in nowise indicates the higher degrees of moistureproofness which can be secured. Sheets or films of regenerated cellulose coated in accordance with this invention will generally show not only 7 but 25, 50, 100 or even several hundred times the resistance to the passage of moisture or water vapor, as will the uncoated sheet when tested under the same conditions. Moreover, the final product retains all of the desirable characteristics including transparency and flexibility possessed by the sheets or films of regenerated cellulose.

If it is desired to produce a colored product, a coloring agent, such as a pigment or dye, may be added to the coating solution.

Though the above specific description relates to the treatment of sheets or films of regenerated cellulose, it is apparent that the method is equally applicable to other materials, such as, for example, paper, fabrics, leather, metal etc.

By the term "moistureproof" or its equivalent as applied to the films or protective coatings herein described, we mean the ability to resist the transmission or diffusion of moisture or water vapor to an ex ent at least 3 times as great as that displayed by films or coatings of equal thickness and produced from cellulose ester lacquers heretofore formulated without the admixture thereto of waxes or wax-like materials when tested under the same conditions and/or when applied to sheets or films of regenerated cellulose or other cellulosic base to yield a product which is at least 7 times as effective in resisting the transmission or diffusion of moisture therethrough as the uncoated sheets when tested under the same conditions.

It should be understood that the above definition merely sets forth the minimum improvements in moistureproofing effect which can be obtained from the invention and that the compositions are inherently capable, in many formulations according to the disclosures here set forth, of producing films showing an improvement over prior art coatings of not only 3, but 10, 20, 40, and in some cases even 100 fold. This is an effect which has not been heretofore possible to obtain with cellulose ester lacquers formulated in the usual way with gums, resins, oils, plasticizers, etc. but without waxes or wax-like materials. When applied to regenerated cellulose or other cellulosic base, a coated sheet is obtained by the invention which will readily show not only 7, but as much as 25, 50, 100, or in some cases several hundred times the resistance to the passage of moisture vapor as will the uncoated sheet when tested under the same conditions. It is therefore evident that the figures set forth in the above definition are in nowise limiting in respect to the higher degrees of moistureproofing that can be obtained.

This application is a division of application Serial No. 308,873 filed Sept. 27, 1928 which is in turn a division of application Serial No. 158,816 filed Jan. 3, 1927.

We claim:

1. A method of preparing a moistureproof material which comprises applying a composition containing a minor quantity of a waxy substance to a base and subjecting the coated material to a temperature above the melting point of the waxy substance in the composition.

2. A method of preparing a moistureproof material which comprises applying a composition containing a minor quantity of a waxy substance to a base of a cellulosic material and subjecting the coated material to a temperature above the melting point of the waxy substance in the composition.

3. A method of preparing a transparent moistureproof material which comprises applying a composition containing a minor quantity of a waxy substance to a transparent base and subjecting the coated material to a temperature above the melting point of the wax in the composition.

4. A method of preparing a transparent moistureproof material which comprises applying a composition containing a minor quantity of a waxy substance to a transparent sheet or film of regenerated cellulose and subjecting the coated material to a temperature above the melting point of the wax in the composition.

5. A method of preparing a moistureproof material which comprises applying a composition containing a minor quantity of a waxy substance to a base and subjecting the coated material to a temperature above the melting point of the waxy substance in the composition, and heating the dried material.

6. A method of preparing a moistureproof material which comprises applying a composition containing a minor quantity of a waxy substance to a base of a cellulosic material and subjecting the coated material to a temperature above the melting point of the waxy substance in the composition, and heating the dried material.

7. A method of preparing a transparent moistureproof material which comprises applying a composition containing a minor quantity of a waxy substance to a transparent base and subjecting the coated material to a temperature above the melting point of the wax in the composition, and heating the dried material.

8. A method of preparing a transparent moistureproof material which comprises applying a composition containing a minor quantity of a waxy substance to a transparent sheet or film of regenerated cellulose and subjecting the coated material to a temperature above the melting point of the wax in the composition, and heating the dried material.

9. A method of preparing a moistureproof material which comprises applying a composition containing a minor quantity of a waxy substance to a base and subjecting the coated material to a temperature above the melting point of the waxy substance in the composition, and subjecting the dried material to a humidifying treatment.

10. A method of preparing a moistureproof material which comprises applying a composition containing a minor quantity of a waxy substance to a base of a cellulosic material and subjecting the coated material to a temperature above the melting point of the waxy substance in the composition, and subjecting the dried material to a humidifying treatment.

11. A method of preparing a moistureproof material which comprises applying a composition comprising a cellulose derivative, a wax and a solvent to a sheet or film of a cellulosic material and evaporating the solvent at a temperature above the melting point of the wax in the composition.

12. A method of preparing a moistureproof material which comprises applying a composition comprising a cellulose derivative, a wax and a solvent to a sheet or film of a cellulosic material and evaporating the solvent at a temperature above the melting point of the wax in the composition in an atmosphere having a low moisture content.

13. A method of preparing a moistureproof material which comprises applying a composition comprising a cellulose derivative, a wax and a solvent to a sheet or film of a cellulosic material, evaporating the solvent at a temperature above the melting point of the wax in the composition and subjecting the dried product to the action of heat.

14. A method of preparing a moistureproof material which comprises applying a composition comprising a cellulose derivative, a wax and a solvent to a sheet or film of a cellulosic material, evaporating the solvent at a temperature above the melting point of the wax in the composition in an atmosphere having a low moisture content and subjecting the dried product to the action of heat.

15. A method of preparing a moistureproof material which comprises applying a composition comprising a cellulose derivative, a wax and a solvent to a sheet or film of a cellulosic material, evaporating the solvent at a temperature above the melting point of the wax in the composition and subjecting the dried product to a humidifying treatment.

16. A method of preparing a moistureproof material which comprises applying a composition comprising a cellulose derivative, a wax and a solvent to a sheet or film of a cellulosic material, evaporating the solvent at a temperature above the melting point of the wax in the composition in an atmosphere having a low moisture content and subjecting the dried product to a humidifying treatment.

17. A method of preparing a transparent moistureproof material which comprises applying a composition containing a minor quantity of a waxy substance to a transparent base and subjecting the coated material to a temperature above the melting point of the wax in the composition, and subjecting the dried material to a humidifying treatment.

18. A method of preparing a transparent moistureproof material which comprises applying a composition containing a minor quantity of a waxy substance to a transparent sheet or film of regenerated cellulose and subjecting the coated material to a temperature above the melting point of the wax in the composition, and subjecting the dried material to a humidifying treatment.

19. A method of preparing a moistureproof material which comprises forming a film of a solution comprising a cellulose derivative and a wax and evaporating the solvent at a temperature above the melting point of the wax in the composition.

20. A method of preparing a moistureproof material which comprises forming a film of a solution comprising a cellulose derivative and a wax, evaporating the solvent at a temperature above the melting point of the wax in the composition in an atmosphere having a low moisture content.

21. A method of preparing a moistureproof material which comprises forming a film of a solution comprising a cellulose derivative and a wax, evaporating the solvent at a temperature above the melting point of the wax in the composition and subjecting the dried product to the action of heat.

22. A method of preparing a moistureproof material which comprises forming a film of a solution comprising a cellulose derivative and a wax, evaporating the solvent at a temperature above the melting point of the wax in the composition in an atmosphere having a low moisture content and subjecting the dried product to the action of heat.

23. A method of preparing a moistureproof material which comprises forming a film of a solution comprising a cellulose derivative and a wax, evaporating the solvent at a temperature above the melting point of the wax in the composition and subjecting the dried product to a humidifying treatment.

24. A method of preparing a moistureproof material which comprises forming a film of a solution comprising a cellulose derivative and a wax, evaporating the solvent at a temperature above the melting point of the wax in the composition in an atmosphere having a low moisture content and subjecting the dried product to a humidifying treatment.

25. A method of preparing a moistureproof material which comprises forming a film of a solution comprising a cellulose derivative, a resin, a wax and a plasticizer and evaporating the solvent at a temperature above the melting point of the wax in the composition.

26. A method of preparing a moistureproof material which comprises forming a film of a solution comprising a cellulose derivative, a resin, a wax and a plasticizer and evaporating the solvent at a temperature above the melting point of the wax in the composition in an atmosphere having a low moisture content.

27. A method of preparing a moistureproof material which comprises forming a film of a solution comprising a cellulose derivative, a resin, a wax and a plasticizer, evaporating the solvent at a temperature above the melting point of the wax in the composition and subjecting the dried product to the action of heat.

28. A method of preparing a moistureproof material which comprises forming a film of a solution comprising a cellulose derivative, a resin, a wax and a plasticizer, evaporating the solvent at a temperature above the melting point of the wax in the composition in an atmosphere having a low moisture content and subjecting the dried product to the action of heat.

29. A method of preparing a moistureproof material which comprises forming a film of a solution comprising a cellulose derivative, a resin, a wax and a plasticizer, evaporating the solvent at a temperature above the melting point of the wax in the composition and subjecting the dried product to a humidifying treatment.

30. A method of preparing a moistureproof material which comprises forming a film of a solution comprising a cellulose derivative, a resin, a wax and a plasticizer, evaporating the solvent at a temperature above the melting point of the wax in the composition in an atmosphere having a low moisture content and subjecting the dried product to a humidifying treatment.

31. A method of preparing a moistureproof material which comprises applying a composition comprising a cellulose derivative, a wax and a solvent to a sheet or film of regenerated cellulose and evaporating the solvent at a temperature above the melting point of the wax in the composition.

32. A method of preparing a moistureproof material which comprises applying a composition comprising a cellulose derivative, a wax and a solvent to a sheet or film of regenerated cellulose and evaporating the solvent at a temperature above the melting point of the wax in the composition in an atmosphere having a low moisture content.

33. A method of preparing a moistureproof material which comprises applying a composition comprising a cellulose derivative, a wax and a solvent to a sheet or film of regenerated cellulose, evaporating the solvent at a temperature above the melting point of the wax in the composition and subjecting the dried product to the action of heat.

34. A method of preparing a moistureproof material which comprises applying a composition comprising a cellulose derivative, a wax and a solvent to a sheet or film of regenerated cellulose, evaporating the solvent at a temperature above the melting point of the wax in the composition in an atmosphere having a low moisture content and subjecting the dried product to the action of heat.

35. A method of preparing a moistureproof material which comprises applying a composition comprising a cellulose derivative, a wax and a solvent to a sheet or film of regenerated cellulose, evaporating the solvent at a temperature above the melting point of the wax in the composition and subjecting the dried product to a humidifying treatment.

36. A method of preparing a moistureproof material which comprises applying a composition comprising a cellulose derivative, a wax and a solvent to a sheet or film of regenerated cellulose, evaporating the solvent at a temperature above the melting point of the wax in the composition in an atmosphere having a low moisture content and subjecting the dried product to a humidifying treatment.

37. A method of preparing a moistureproof material which comprises applying a composition comprising a cellulose derivative, a resin, a wax, a plasticizer and a solvent to a sheet or film of regenerated cellulose and evaporating the solvent at a temperature above the melting point of the wax in the composition.

38. A method of preparing a moistureproof material which comprises applying a composition comprising a cellulose derivative, a resin, a wax, a plasticizer and a solvent to a sheet or film of regenerated cellulose and evaporating the solvent at a temperature above the melting point of the wax in the composition in an atmosphere having a low moisture content.

39. A method of preparing a moistureproof material which comprises applying a composition comprising a cellulose derivative, a wax, a resin, a plasticizer and a solvent to a sheet or film of regenerated cellulose, evaporating the solvent at a temperature above the melting point of the wax in the composition and subjecting the dried product to the action of heat.

40. A method of preparing a moistureproof material which comprises applying a composition comprising a cellulose derivative, a wax, a resin, a plasticizer and a solvent to a sheet or film of regenerated cellulose, evaporating the solvent at a temperature above the melting point of the wax in the composition in an atmosphere having a low moisture content and subjecting the dried product to the action of heat.

41. A method of preparing a moistureproof material which comprises applying a composition comprising a cellulose derivative, a wax, a resin, a plasticizer and a solvent to a sheet or film of regenerated cellulose, evaporating the solvent at a temperature above the melting point of the wax in the composition and subjecting the dried product to a humidifying treatment.

42. A method of preparing a moistureproof material which comprises applying a composition comprising a cellulose derivative, a wax, resin, a plasticizer and a solvent to a sheet or film of regenerated cellulose, evaporating the solvent at a temperature above the melting point of the wax in the composition in an atmosphere having a low moisture content and subjecting the dried product to a humidifying treatment.

43. A method of preparing a moistureproof material which comprises applying a composition comprising a cellulose derivative, a resin, a wax, a plasticizer and a solvent to a sheet or film of a cellulosic material and evaporating the solvent at a temperature above the melting point of the wax in the composition.

44. A method of preparing a moistureproof material which comprises applying a composition comprising a cellulose derivative, a resin, a wax, a plasticizer and a solvent to a sheet or film of a cellulosic material and evaporating the solvent at a temperature above the melting point of the wax in the composition in an atmosphere having a low moisture content.

45. A method of preparing a moistureproof material which comprises applying a composition comprising a cellulose derivative, a wax, a resin, a plasticizer and a solvent to a sheet or film of a cellulosic material, evaporating the solvent at a temperature above the melting point of the wax in the composition and subjecting the dried product to the action of heat.

46. A method of preparing a moistureproof material which comprises applying a composition comprising a cellulose derivative, a wax, a resin, a plasticizer and a solvent to a sheet or film of a cellulosic material, evaporating the solvent at a temperature above the melting point of the wax in the composition in an atmosphere having a low moisture content and subjecting the dried product to the action of heat.

47. A method of preparing a moistureproof material which comprises applying a composition comprising a cellulose derivative, a wax, a resin, a plasticizer and a solvent to a sheet or film of a cellulosic material, evaporating the solvent at a temperature above the melting point of the wax in the composition and subjecting the dried product to a humidifying treatment.

48. A method of preparing a moistureproof material which comprises applying a composition comprising a cellulose derivative, a wax, a resin, a plasticizer and a solvent to a sheet or film of a cellulosic material, evaporating the solvent at a temperature above the melting point of the wax in the composition in an atmosphere having a low moisture content and subjecting the dried product to a humidifying treatment.

49. A method of preparing a moistureproof material which comprises forming a film of a solution comprising a cellulose derivative, a resin and a wax and evaporating the solvent at a temperature above the melting point of the wax in the composition.

50. A method of preparing a moistureproof material which comprises forming a film of a solution comprising a cellulose derivative, a resin and a wax and evaporating the solvent at a temperature above the melting point of the wax in the composition in an atmosphere having a low moisture content.

51. A method of preparing a moistureproof material which comprises forming a film of a solution comprising a cellulose derivative, a resin and a wax, evaporating the solvent at a temperature above the melting point of the wax in the composition and subjecting the dried product to the action of heat.

52. A method of preparing a moistureproof material which comprises forming a film of a solution comprising a cellulose derivative, a resin and a wax, evaporating the solvent at a temperature above the melting point of the wax in the composition in an atmosphere having a low moisture content and subjecting the dried product to the action of heat.

53. A method of preparing a moistureproof material which comprises forming a film of a solution comprising a cellulose derivative, a resin and a wax, evaporating the solvent at a temperature above the melting point of the wax in the composition and subjecting the dried product to a humidifying treatment.

54. A method of preparing a moistureproof material which comprises forming a film of a solution comprising a cellulose derivative, a resin and a wax, evaporating the solvent at a temperature above the melting point of the wax in the composition in an atmosphere having a low moisture content and subjecting the dried product to a humidifying treatment.

55. A method of preparing a moistureproof material which comprises forming a film of a solution comprising a cellulose derivative, a resin and a wax, evaporating the solvent at a temperature above the melting point of the wax in the composition in an atmosphere having a low moisture content and heating and humidifying the dried material.

56. A method of preparing a moistureproof material which comprises applying a composition comprising a cellulose derivative, a resin, a wax and a solvent to a sheet or film of a cellulosic material and evaporating the solvent at a temperature above the melting point of the wax in the composition.

57. A method of preparing a moistureproof material which comprises applying a composition comprising a cellulose derivative, a resin, a wax and a solvent to a sheet or film of a cellulosic material and evaporating the solvent at a temperature above the melting point of the wax in the composition in an atmosphere having a low moisture content.

58. A method of preparing a moistureproof material which comprises applying a composition comprising a cellulose derivative, a wax, a resin and a solvent to a sheet or film of a cellulosic material, evaporating the solvent at a temperature above the melting point of the wax in the composition and subjecting the dried product to the action of heat.

59. A method of preparing a moistureproof material which comprises applying a composition comprising a cellulose derivative, a wax, a resin and a solvent to a sheet or film of a cellulosic material, evaporating the solvent at a temperature above the melting point of the wax in the composition in an atmosphere having a low moisture content and subjecting the dried product to the action of heat.

60. A method of preparing a moistureproof material which comprises applying a composition comprising a cellulose derivative, a wax, a resin and a solvent to a sheet or film of a cellulosic material, evaporating the solvent at a temperature above the melting point of the wax in the composition and subjecting the dried product to a humidifying treatment.

61. A method of preparing a moistureproof material which comprises applying a composition comprising a cellulose derivative, a wax, a resin and a solvent to a sheet or film of a cellulosic material, evaporating the solvent at a temperature above the melting point of the wax in the composition in an atmosphere having a low moisture content and subjecting the dried product to a humidifying treatment.

62. A method of preparing a moistureproof material which comprises applying a composition comprising a cellulose derivative, a wax, a resin and a solvent to a sheet or film of a cellulosic material, evaporating the solvent at a temperature above the melting point of the wax in the composition and heating and humidifying the coated material.

63. A method of preparing a moistureproof material which comprises applying a composition comprising a cellulose derivative, a resin, a wax and a solvent to a sheet or film of regenerated cellulose and evaporating the solvent at a temperature above the melting point of the wax in the composition.

64. A method of preparing a moistureproof material which comprises applying a composition comprising a cellulose derivative, a resin, a wax and a solvent to a sheet or film of regenerated cellulose and evaporating the solvent at a temperature above the melting point of the wax in the composition in an atmosphere having a low moisture content.

65. A method of preparing a moistureproof material which comprises applying a composition comprising a cellulose derivative, a wax, a resin and a solvent to a sheet or film of regenerated cellulose, evaporating the solvent at a temperature above the melting point of the wax in the composition and subjecting the dried product to the action of heat.

66. A method of preparing a moistureproof material which comprises applying a composition comprising a cellulose derivative, a wax, a resin and a solvent to a sheet or film of regenerated cellulose, evaporating the solvent at a temperature above the melting point of the wax in the composition in an atmosphere having a low moisture content and subjecting the dried product to the action of heat.

67. A method of preparing a moistureproof material which comprises applying a composition comprising a cellulose derivative, a wax, a resin and a solvent to a sheet or film of regenerated cellulose, evaporating the solvent at a temperature above the melting point of the wax in the composition and subjecting the dried product to a humidifying treatment.

68. A method of preparing a moistureproof material which comprises applying a composition comprising a cellulose derivative, a wax, a resin and a solvent to a sheet or film of regenerated cellulose, evaporating the solvent at a temperature above the melting point of the wax in the composition in an atmosphere having a low moisture content and subjecting the dried product to a humidifying treatment.

69. A method of preparing a moistureproof material which comprises applying a composition comprising a cellulose derivative, a wax, a resin and a solvent to a sheet or film of regenerated cellulose, evaporating the solvent at a temperature above the melting point of the wax in the composition and heating and humidifying the dried product.

70. A method of preparing a moistureproof material which comprises applying a composition containing a minor quantity of a waxy substance to a base and subjecting the coated material to a temperature above the melting point of the waxy substance in the composition, and heating and humidifying the dried material.

71. A method of preparing a moistureproof material which comprises applying a composition containing a minor quantity of a waxy substance to a base of a cellulosic material and subjecting the coated material to a temperature above the melting point of the waxy substance in the composition, and heating and humidifying the dried material.

72. A method of preparing a transparent moistureproof material which comprises applying a composition containing a minor quantity of a waxy substance to a transparent base and subjecting the coated material to a temperature above the melting point of the wax in the composition, and heating and humidifying the dried material.

73. A method of preparing a transparent moistureproof material which comprises applying a composition containing a minor quantity of a waxy substance to a transparent sheet or film of regenerated cellulose and subjecting the coated material to a temperature above the melting point of the wax in the composition, and heating and humidifying the dried material.

74. A method of preparing a moistureproof material which comprises forming a film of a solution comprising a cellulose derivative and a wax, evaporating the solvent at a temperature above the melting point of the wax in the composition and heating and humidifying the dried product.

75. A method of preparing a moistureproof material which comprises forming a film of a solution comprising a cellulose derivative, a resin, a wax and a plasticizer, evaporating the solvent at a temperature above the melting point of the wax in the composition and heating and humidifying the dried product.

76. A method of preparing a moistureproof material which comprises applying a composition comprising a cellulose derivative, a wax and a solvent to a sheet or film of regenerated cellulose, evaporating the solvent at a temperature above the melting point of the wax in the composition and heating and humidifying the dried product.

77. A method of coating which comprises applying a moistureproofing solution comprising a cellulose derivative, a wax and a solvent to a base, and evaporating the solvent at a temperature above the melting point of the wax in the composition.

78. A method of coating which comprises applying a moistureproofing solution comprising a cellulose derivative, a wax, a resin and a solvent to a base, and evaporating the solvent at a temperature above the melting point of the wax in the composition.

79. A method of coating which comprises applying a moistureproofing solution comprising a cellulose derivative, a wax, a resin, a plasticizer and a solvent to a base, and evaporating the solvent at a temperature above the melting point of the wax in the composition.

80. A method of coating which comprises applying a moistureproofing solution comprising a cellulose derivative, a wax and a solvent to a base, evaporating the solvent at a temperature above the melting point of the wax in the composition, and heating the dried material.

81. A method of coating which comprises applying a moistureproofing solution comprising a cellulose derivative, a wax, a resin and a solvent to a base, evaporating the solvent at a temperature above the melting point of the wax in the composition, and heating the dried material.

82. A method of coating which comprises applying a moistureproofing solution comprising a cellulose derivative, a wax, a resin, a plasticizer and a solvent to a base, evaporating the solvent at a temperature above the melting point of the wax in the composition, and heating the dried material.

83. A method of coating which comprises applying a moistureproofing solution comprising a cellulose derivative and a wax to a base, and heating the coated base in an atmosphere at a temperature above the melting point of the wax in the composition.

84. A method of coating which comprises applying a moistureproofing solution comprising a cellulose derivative, a gum and a wax to a base, and heating the coated base in an atmosphere at a temperature above the melting point of the wax in the composition.

85. A method of coating which comprises applying a moistureproofing solution comprising a cellulose derivative, a gum, a plasticizer and a wax to a base, and heating the coated base in an atmosphere at a temperature above the melting point of the wax in the composition.

86. A method of coating which comprises applying a moistureproofing solution comprising a cellulose derivative and a wax to a base of a cellulosic material, and heating the coated base in an atmosphere at a temperature above the melting point of the wax in the composition.

87. A method of coating which comprises applying a moistureproofing solution comprising a cellulose derivative, a gum and a wax to a base of a cellulosic material, and heating the coated base in an atmosphere at a temperature above the melting point of the wax in the composition.

88. A method of coating which comprises applying a moistureproofing solution comprising a cellulose derivative, a gum, a plasticizer and a wax to a base of a cellulosic material, and heating the coated base in an atmosphere at a temperature above the melting point of the wax in the composition.

89. A method of coating which comprises applying a moistureproofing solution comprising a cellulose derivative and a wax to a sheet or film of regenerated cellulose, and heating the sheet or film in an atmosphere at a temperature above the melting point of the wax in the composition.

90. A method of coating which comprises applying a moistureproofing solution comprising a cellulose derivative, a gum and a wax to a sheet or film or regenerated cellulose, and heating the coated sheet or film in an atmosphere at a temperature above the melting point of the wax in the composition.

91. A method of coating which comprises applying a moistureproofing solution comprising a cellulose derivative, a gum, a plasticizer and a wax to a sheet or film of regenerated cellulose, and heating the coated sheet or film in an atmosphere at a temperature above the melting point of the wax in the composition.

In testimony whereof, we have affixed our signatures to this specification.

WILLIAM HALE CHARCH.
KARL EDWIN PRINDLE.

CERTIFICATE OF CORRECTION.

Patent No. 1,826,699. Granted October 6, 1931, to

WILLIAM H. CHARCH ET AL.

It is hereby certified that error appears in the printed specification of the above numbered patent requiring correction as follows: Page 1, lines 87 and 88, "pyroxylin" should be hyphenated; page 4, line 47, for the word "of" second occurrence read to; line 115, for "ex ent" read extent; page 10, line 9, claim 76, for the misspelled word "exaporating" read evaporating; line 104, claim 90, for the word "or" first occurrence read of; and that the said Letters Patent should be read with these corrections therein that the same may conform to the record of the case in the Patent Office.

Signed and sealed this 3rd day of November, A. D. 1931.

(Seal)

M. J. Moore,
Acting Commissioner of Patents.

CERTIFICATE OF CORRECTION.

Patent No. 1,826,699.                                               Granted October 6, 1931, to

WILLIAM HALE CHARCH ET AL.

It is hereby certified that Certificate of Correction issued November 3, 1931, was erroneously drawn as to line 104, claim 90, and that this line should read "wax to a sheet or film of regenerated cel-"; and that the said Certificate should be read with this correction therein that the same may conform to the record of the case in the Patent Office.

Signed and sealed this 10th day of November, A. D. 1931.

(Seal)                                                                   M. J. Moore,
Acting Commissioner of Patents.